A. P. Brown.
Turning Lathe.
Nº 56,172. Patented Jul. 10, 1866.
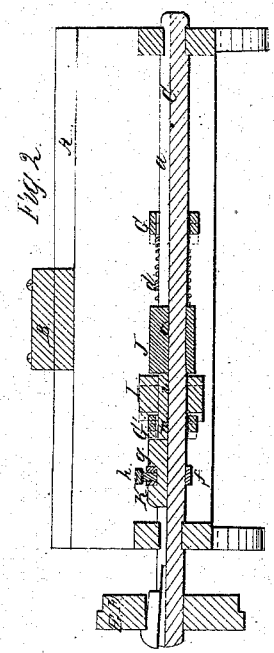
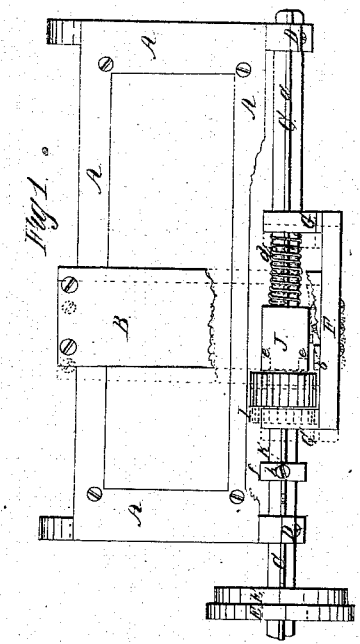
Witnesses:
Thos. H. Dodge
Inventor:
A. P. Brown

UNITED STATES PATENT OFFICE.

A. P. BROWN, OF WORCESTER, MASSACHUSETTS, ASSIGNOR TO L. W. POND.

IMPROVED FEED-STOP FOR LATHES.

Specification forming part of Letters Patent No. 56,172, dated July 10, 1866.

*To all whom it may concern:*

Be it known that I, A. P. BROWN, of the city and county of Worcester, and State of Massachusetts, have invented certain new and useful Improvements in Feed-Stops for Engine-Lathes; and I do hereby declare that the following is a full, clear, and exact description of the same, reference being had to the accompanying drawings, forming a part of this specification, in which—

Figure 1 represents a plan view of so much of the bed and feed apparatus of an engine-lathe as is necessary to illustrate my invention, and Fig. 2 represents a longitudinal central section through the feed-shaft and the device for stopping the feed.

In the drawings, A represents the bed of the machine, which may be of any desired shape. B represents the sliding frame to which the tool is attached, a part of which is represented as broken away to give a better view of my improvements. C represents the usual feed-shaft, which is to be supported in suitable bearings D D, attached to the side of the lathe.

A rotary motion is imparted to feed-shaft C by a band or belt acting upon the cone-pulleys E E, any desired number of which may be employed, to change the speed of feed-shaft C, which is to be driven in the ordinary manner from a proper cone-shaft attached to the lathe.

I make the feed-shaft C with a slot or groove, *a*, running quite or nearly the whole length of the shaft. A piece, F, having projecting ears G G', through which feed-shaft C passes, extends up and is fastened to the sliding frame B, which supports the tool-stand. A gear, I, is placed loose upon feed-shaft C. One end of gear I abuts against the inside of ear G', while a small projection, *b*, from the inside of piece F projects by the other end of gear I, so that as frame or piece F moves back and forth gear I moves with it. From the right-hand end of gear I project two lugs or clutch-pieces, (shown in black and red dotted lines, Fig. 1,) which fit into corresponding holes or recesses in the left-hand end of collar J, which is fitted upon feed-shaft C so that it can slide longitudinally on shaft C, but must always turn with said shaft, since its tongue *c* fits into slot or groove *a* in shaft C.

A spiral spring, *d*, placed upon shaft C, between ear G and collar J, forces collar J against gear I, whereby the lugs or clutches upon gear I are kept in notches in collar J, as indicated in dotted lines *e e*, Fig. 1.

A spline, K, is fastened in the slot or groove *a* in feed-rod C by means of a ring, *f*, which encircles rod C and fits into a notch, *g*, in spline K. A set-screw, *h*, passes through ring *f*, and by means of which spline K can be set at any point upon the feed-rod C. A feather, *i*, extends from spline K in the groove or slot *a* to such distance that when ear G' is up flush with the shoulder *m* feather *i* will pass beyond the right-hand side of gear I sufficiently far to force back and disengage collar J from the lugs or clutches upon gear I, as indicated in red lines. When collar J is forced back spring *d* is compressed.

The usual mode of communicating motion from gear I to the tool stand or rest, which is fastened to piece F, is by a series of gears working in connection with gear I, the shaft of the last one having a screw which works into a stationary rack fastened to the side of the engine-lathe frame. As this latter arrangement is a well-known and common device, a further description is unnecessary.

The operation of my invention is as follows: The frame B and piece F and the parts connected therewith are run back the proper distance to commence work, when spline K is set at the desired point to have the feed stop and the work commences. As shaft C revolves collar J is also turned, thereby giving motion to gear I, which, in turn, gives motion to tool rest or stand in the usual manner. The work proceeds until gear I passes over feather *i*, the end of which, striking against the feather or tongue *c* of collar J, forces collar J back, thereby disengaging it from the clutch-gear I, which immediately stops the feed, although shaft C and collar J continue to revolve.

It will thus be seen that by the use of my invention the feed may be stopped at any desired point.

By the introduction of my improvement one mechanic can direct the running of several engine-lathes at the same time, and that, too, without danger of spoiling the work by allowing the feed to run too long.

Heretofore upon nice or particular work it has been usual to confine the attention of the mechanic to one engine-lathe, whereas by my invention one mechanic can tend several lathes, thus accomplishing two or three times the labor in the same length of time, besides doing the work with greater accuracy and uniformity, since no mechanic can stop an engine-lathe so accurately as it can be done by machinery.

Having described my improved feed-stop for engine-lathes, what I claim therein as new and of my invention, and desire to secure by Letters Patent, is—

1. The combination, with the feed-rod, of collar J, gear I, and adjustable spline K, substantially as set forth.

2. The combination, with feed-rod C, of ears G G', spiral spring $d$, clutch-collar J, gear I, and adjustable spline K, substantially as set forth.

3. The combination, with the feed-rod of an engine-lathe, of a feed-stop device constructed and arranged as described, whereby the feeding or forward motion of the cutter or tool frame can be automatically stopped at any desired point without stopping the feed-rod, substantially as set forth.

A. P. BROWN.

Witnesses:
 THOS. H. DODGE,
 H. L. FULLER.